United States Patent [19]

Manders

[11] 4,246,109
[45] Jan. 20, 1981

[54] OIL FILTER APPARATUS

[76] Inventor: Logan J. Manders, P.O. Box 284, Delmar, Del. 19940

[21] Appl. No.: 77,832

[22] Filed: Sep. 21, 1979

[51] Int. Cl.³ .................................. B01D 27/10
[52] U.S. Cl. .......................... 210/90; 210/130; 210/136
[58] Field of Search ............... 210/90, 91, 130, 136

[56] References Cited

U.S. PATENT DOCUMENTS

| | | | |
|---|---|---|---|
| 3,070,232 | 12/1962 | Casaleggi | 210/130 X |
| 3,644,915 | 2/1972 | McBurnett | 210/90 X |
| 3,790,931 | 2/1974 | Leveraus | 210/90 X |

*Primary Examiner*—John Adee
*Attorney, Agent, or Firm*—John J. Byrnz; Edward E. Dyson

[57] ABSTRACT

An electronic oil filter apparatus in which an electrically conductive probe is mounted within an oil filter canister and is responsive to pressure build up on a bypass valve within the oil filter. The pressure build up is caused by clogging of the filter which eventually results in opening the bypass valve allowing dirty oil to flow around the filter. When the valve is actuated in response to excess pressure build up, a low voltage switching device allows current to flow to a signal means thereby indicating a need to change the filter.

4 Claims, 5 Drawing Figures

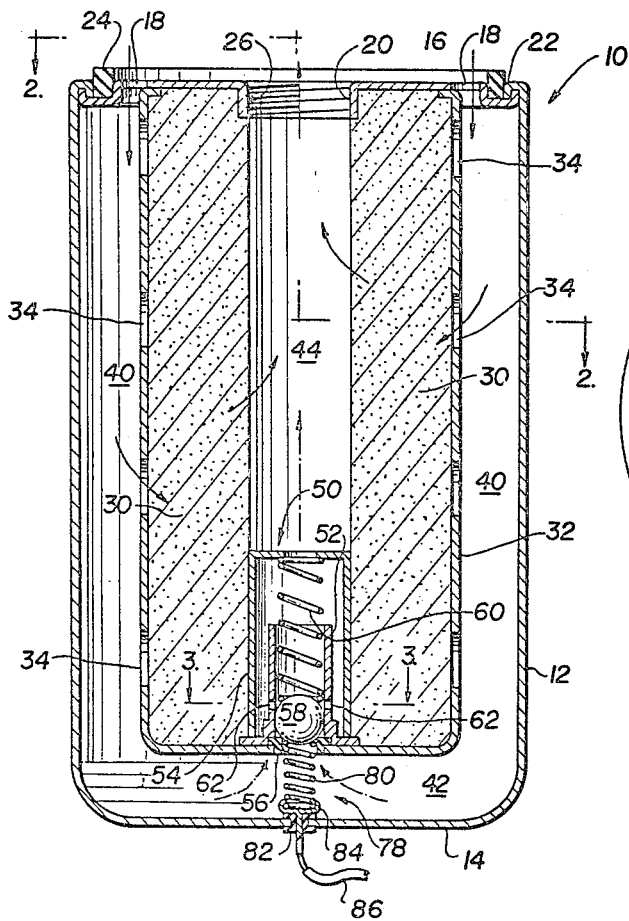
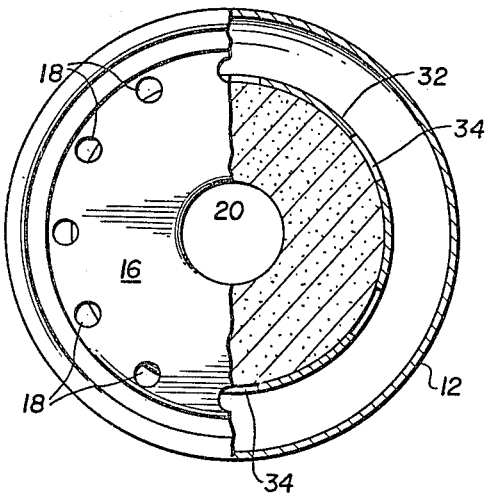
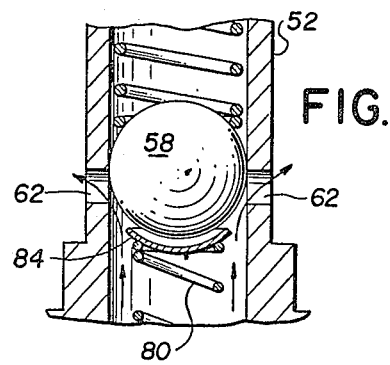
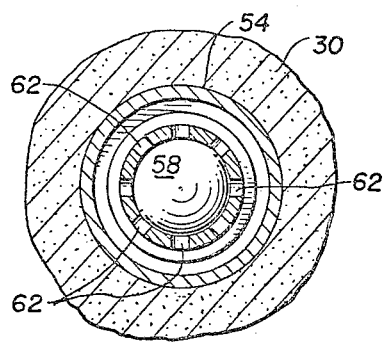
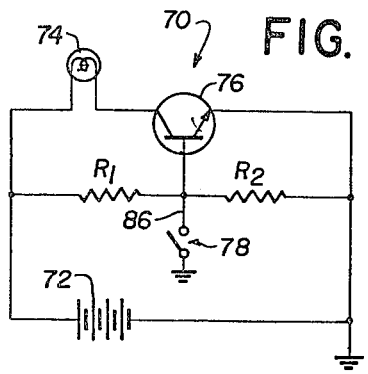

OIL FILTER APPARATUS

BACKGROUND OF THE INVENTION

This invention relates to a novel oil filter apparatus. More particularly the invention comprises an electronic apparatus for monitoring the condition of an oil filter used to filter oil in a conventional automobile or truck engine.

In operation internal combustion engines, and the like, having a large number of relative moving parts are continuously lubricated by an associated lubrication system. The lubrication system typically includes an oil sump from which oil is pumped in a fluidic loop or splashed around and over moving engine parts such as valves, piston rods, etc. In order to eliminate abrasives which become suspended within the lubrication system the oil is continuously pumped through an oil filter mounted in series with the oil loop.

Conventional oil filters typically comprises an oil canister having a generally hollow cylindrical body with a first closed end. The other end of the oil canister is provided with a plurality of axially directed inlet ports which are spaced peripherally about the perimeter of the canister and a threaded outlet port which coaxially extends into the canister for connection with a compatible engine mounting. A hollow cylindrical filter body is coaxially mounted within the oil canister and forms in cooperation with the canister an annular inlet chamber between the inner periphery of the canister and the exterior surface of the cylindrical filter. The hollow core of the filter body itself forms an outlet chamber which opens directly into the outlet port.

In the event the filter element becomes clogged with suspended fines at least some lubrication systems provide a bypass valve within the engine so that dirty oil is circulated past the oil filter. In such systems a user is often unaware when the bypass is actuated and accordingly may operate an engine for an extended period of time with unfiltered abrasive oil.

At least one previously known system is designed to signal actuation of an engine mounted bypass valve. In this regard the valve structure is placed in series with an engine battery and in parallel with an alarm. In the event the bypass valve and circuit is opened the battery will conduct through the alarm thus signalling opening of the bypass valve.

While such a system provides at least a degree of theoretical appeal one disadvantage is that alarm systems of this type require special fitting within an oil system. Additionally a potential for sparking exists within the oil system when the bypass electrical circuit is broken.

The difficulties suggested in the preceding are not intended to be exhaustive, but rather are among many which may tend to reduce the effectiveness of prior oil filter methods and apparatus. Other noteworthy problems may also exist; however, those presented above should be sufficient to demonstrate that oil filter methods and apparatus appearing in the past will admit to worthwhile improvement.

In the above connection it would be desirable to provide an oil filter method and apparatus which may be facially connected to an existing automobile engine or the like without requiring a redesign or special oil fitting for the engine. Additionally it would be desirable to provide a method and apparatus for signalling opening of a filter bypass while minimizing the possibility of creating a spark within the lubrication system.

It would also be desirable to provide an oil filter apparatus which is inexpensive to purchase and which can accurately and reliably reflect opening of a filter bypass valve.

OBJECTS OF THE INVENTION

It is, therefore, a general object of the invention to provide a novel oil filter apparatus which will obviate or minimize prior difficulties while concomitantly providing desired features of the type previously described.

It is a particular object of the invention to provide a novel oil filter apparatus which may be facially mounted upon a conventional engine.

It is another object of the invention to provide a novel oil filter apparatus wherein an electrical signal will be generated upon opening of a bypass valve within an oil filter while minimizing the possibility of creating a spark within the lubrication system.

It is yet another object of the invention to provide a novel oil filter apparatus which will accurately and reliably signal the opening of an oil bypass valve.

It is a further object of the invention to provide a novel oil filter apparatus which would be commercially feasible to install on standard vehicles.

It is yet a further object of the invention to provide a novel oil filter apparatus which will signal clogged oil filter condition by breaking an extremely low voltage connection.

BRIEF SUMMARY OF THE INVENTION

A preferred oil filter apparatus intended to achieve at least some of the foregoing objects comprises a throw away oil filter canister with a bypass valve axially mounted therein.

The bypass valve is electrically connected between a common ground and a base of a transistor switching circuit. The transistor switch is biased to pass current to a signal when the low voltage of the base to common ground is interrupted. Accordingly a signal is actuated when the bypass valve opens without creating a potential for arcing within the lubrication system.

THE DRAWINGS

Other objects and advantages of the present invention will become apparent from the following detailed description of a preferred embodiment thereof taken in conjunction with the accompanying drawings, wherein:

FIG. 1 is a cross-sectional view of an oil filter canister and bypass valve arrangement according to a preferred embodiment of the invention;

FIG. 2 is a cross-sectional view taken along section line 2—2 in FIG. 1 and discloses a typical oil canister filter construction;

FIG. 3 is a partial cross-sectional view taken along section line 3—3 in FIG. 1 and discloses a novel valve switch arrangement in accordance with the invention;

FIG. 4 is a detailed view of the novel valve switch as depicted in FIG. 1 in an open posture wherein oil is bypassing the valve and oil filter element; and FIG. 5 is an electrical diagram of the invention wherein a common base transistor circuit enables actuation of a signal lamp upon breaking a low voltage connection to ground.

DETAILED DESCRIPTION

Referring now to the drawings, wherein like numerals indicate like parts, and particularly to FIG. 1 thereof there will be seen an oil filter 10 in accordance with a preferred embodiment of the invention.

The oil filter includes a metallic oil canister 12 which is generally a hollow cylinder with a first closed end 14. The opposite end of the canister 12 is covered with an end plate 16 having a plurality of axially directed ports 18, note FIG. 2, positioned about the periphery of the canister and a port 20 coaxially positioned with respect to the oil canister.

An annular groove 22 is formed within the end plate 16 and carries a compressible oil seal 24 which abuts against a corresponding surface on an engine block in a manner well known in the art. The coaxial part 20 is provided with internal threads 26 which mate with a threaded nipple which in turn is threaded into an engine block. The threaded port 20 enables an attendant to facilely unscrew a used oil canister from an engine block and replace it with a new canister as desired.

A hollow generally cylindrical filter element 30 is coaxially mounted within the oil canister 12 by a metallic canister 32 therein. The filter element or medium 30 is typically fashioned from pressed fibers such as cotton, wool, rayon, nylon or other synthetic fibers; paper or metallic foam or screens.

The radial extent of the filter is less than that of the oil canister and thereby forms an annular inlet zone 40 peripherially extending about the filter and in fluid communication with said plurality of axial inlet ports 18. The axial extent of the filter 30 is also less than that of the oil canister 12 to form an oil zone 42 at the end of the canister for reasons which will be discussed more fully below.

The central portion of the filter element 30 is hollow and forms thereby a central outlet zone 44 in direct fluid communication with the coaxial outlet port 20.

In basic operation oil from an engine lubrication system is pumped through said axial ports 18 and into peripheral inlet zone 40. The oil then passes radially through the apertures 34 and filter medium 30 into the outlet zone 44. From the outlet zone the filtered oil is pumped back into the lubrication system via outlet port 20.

In the event the filter 30 becomes clogged and impacted with fines filtered from the oil the filter 30 will increasingly resist flow into the outlet zone. In order to accomodate filter clogging a bypass valve 50 is built into the oil canister according to a preferred embodiment of the invention.

The bypass valve 50 includes a cylindrical sleeve 52 which is mounted within a casing 54 at the free end of the hollow cylindrical filter 30. A dielectric valve seat 56 is mounted at the base of the sleeve 52 and is configured to sealingly engage a valve body 58.

The valve body 58 depicted in FIGS. 1 and 4 comprises a preferred metallic sphere. Other valve shapes however, may be used with this invention such as cones, cylinders and the like as desired.

The valve body 58 is normally biased against the valve seat 56 by a compression spring 60 which reacts against an inwardly directed radial flange projecting from the casing 54.

A plurality of fluid ports 62, note particularly FIG. 3, extend radially through the sleeve 52 in an axial posture upstream from the valve body 58.

In the event pressure within the annular inlet zone 40 and end zone 42 build up beyond a predetermined acceptable pressure the oil will lift the valve body 58 off of the seat 56 and slide the body 58 up sleeve 52 until the radial ports 62 are uncovered. Once the ports 62 are uncovered oil will flow through the bypass valve and back into the lubrication system without being filtered.

It has been determined that a preferred pressure buildup should not exceed 7.5 psig.

Another significant aspect of the subject invention is a method and apparatus for safety and accurately determining when the bypass valve is permitting oil to flow around the filter unit 30 so that an operator will be apprised as to a need to change the oil filter unit 10.

In this connection an electronic circuit 70 is provided which includes a source of voltage potential 72, such as a battery, a signal 74, such as a lamp, and a transistor switch 76.

The transistor switch preferrably comprises an NPN common ground circuit wherein the lamp 74 is in series with a resistor $R_1$ in the base/collector circuit and a resistor $R_2$ is in the base emittor circuit. The base is connected to a common ground such as an auto engine or chassis through a switch 78.

The switch 78 physically comprises a compression spring 80 extending between a dielectric grommet 82 and an electrical contact plate 84 configured to compatibly engage with valve body 58.

The end of spring 80, adjacent grommet 82, is mechanically connected to an electrical contact clamp 84 which is connected to a wire 86 corresponding to line 86 in the electrical diagram in FIG. 5.

The normal free state of the contact spring 80 is axially longer than the distance between the grommet and the seated valve body, however, the compression spring rate of the contact spring 80 is less than that of biasing spring 60. Accordingly the valve body will remain in contact with the dielectric valve seat 56 until a predetermined oil pressure is reached as previously noted. When the external oil pressure starts to lift the valve body 58 the compression spring and contact plate 84 will follow the valve until the natural length of the contact spring is reached. Further movement of the valve body will cause a separation of the contact plate 84 and valve body 58 and serve to open the switch 78, note FIG. 4.

The normal length of compression spring 80 is chosen so that this separation point occurs just ahead or at the position when oil flows through radial ports 62 and bypasses the filter 30.

The resistances $R_1$ and $R_2$ are chosen in combination with the base common ground connection to reverse bias the transistor 76. When the base to ground contact is broken by travel of the valve body away from the contact 84 the transistor 76 is forward biased and permitts current to pass which actuates the signal 74 indicating the fact that oil is bypassing the filter 30 and that a new filter is required.

When a new filter is needed line 86 is released from an electrical connector (not shown) which connects the oil canister to the electrical signal network. The used filter is then unscrewed from the engine block, thrown away and a new oil canister and bypass valve are facilely installed.

In describing an oil filter method and apparatus in accordance with a preferred embodiment of the invention those skilled in the art will recognize several advantages which singularly distinguish the subject invention from previously known devices.

A particular advantage is the provision of a method and apparatus wherein an oil bypass valve is economically built into a throw away filter canister. The valve is used only once and does not become clogged and sluggish from prior use. In a similar vein the valve body and electrical members remain in sound electrical engagement and are not separated by oil fines and the like which could create short circuits and arcing.

Another significant feature of the instant invention is the provision of breaking a milli or micro-volt potential between the transistor base and common ground when the bypass valve is opened. Such low potentials significantly reduces the possibility of any arcing at the switch contact point during operation of the bypass valve.

Still further the lost motion spring arrangement between the valve body and contact spring enables the oil canister to be economically mass produced with an acceptable range of axial tolerances.

Yet another significant feature of the instant invention is the capability of the unit to be facilely fitted to existing lubrication systems such as exist in conventional automobiles and the like.

In describing the invention, reference has been made to a preferred embodiment. Those skilled in the art however, and familiar with the disclosure of the subject invention, may recognize additions, deletions, modifications, substitutions and/or other changes which will fall within the purview of the invention as defined in the following claims.

What is claimed is

1. In an oil filter system of the type including a generally cylindrical oil filter means mounted concentrically within said canister, oil inlet means fashioned into said canister for permitting oil to enter said canister on one side of said oil filter means and oil outlet means fashioned into said canister for permitting oil to flow out of said canister on the other side of said oil filter means wherein oil from a lubrication system may be pumped into said oil canister through said oil filter means and out of the oil canister in a filtered condition wherein the improvement comprises:

a normally closed oil bypass means positioned within said oil canister and in fluid communication between said inlet means and said outlet means for permitting oil to bypass said filter means within said oil canister and flow directly from said inlet means to said outlet means in the event said filter means becomes clogged with filtered matter, said oil bypass means including, check valve means mounted within said oil canister and having an upstream side thereof in fluid communication with said oil inlet means and a downstream side thereof in fluid communication with said oil outlet means wherein a buildup of oil pressure on the inlet side of said oil filter means in excess of a predetermined value will open said check valve means and permit oil to bypass said filter means within said oil canister, said check valve means including, a hollow cylindrical valve guide, a valve seat positioned at one end of said valve guide, a valve body dimensioned to intimately slide within said valve guide, spring means for biasing said valve body against said valve seat, and radial port means extending through said valve guide downstream of said valve seat for permitting oil to flow through said check valve means when said valve body moves away from said valve seat and axially downstream of said port means; and electrical circuit means connected to said oil bypass means for signaling the existence of a clogged filter within said oil canister and flow of oil through said oil bypass means, said electrical circuit means comprising, a transistor switch operably connected to a source of electrical potential, said switch including a common ground transistor wherein the base of said transistor is connected to a ground potential through said check valve means and said oil canister, signal means connected to said transistor switch, and contact means connected to said check valve means for actuating said transistor switch and said signal means in response to opening of said check valve means, said contact means including, compression spring means extending between a dielectric isolation bushing on said oil canister and in full electrical contact with the upstream side of said valve body, said spring means being dimensioned to be in partial compression when said valve body is positioned upon said valve seat and said spring means having a free extension to a position adjacent to but short of the axial position at which the valve body begins to permit oil to pass through said radial port means wherein electrical contact between said valve body and said spring means will be broken approximately when oil begins to flow through said radial port means.

2. In an oil filter system of the type including a generally cylindrical oil filter means mounted concentrically within said canister, oil inlet means fashioned into said canister for permitting oil to enter said canister on one side of said oil filter means and oil outlet means fashioned into said canister for permitting oil to flow out of said canister on the outer side of said oil filter means wherein oil from a lubrication system may be pumped into said oil canister through said oil filter means and out of the oil canister in a filtered condition wherein the improvement comprises:

a normally closed oil bypass means positioned within said oil canister and in fluid communication between said inlet means and said outlet means for permitting oil to bypass said filter means within said oil canister and flow directly from said inlet means to said outlet means in the event said filter means becomes clogged with filtered matter, said oil bypass means including, check valve means mounted within said oil canister and having an upstream side thereof in fluid communication with said oil inlet means and a downstream side thereof in fluid communication with said oil outlet means wherein a buildup of oil pressure on the inlet side of said oil filter means in excess of a predetermined value will open said check valve means and permit oil to bypass said filter means within said oil canister, said check valve means including, a hollow cylindrical valve guide, a valve seat positioned at one end of said valve guide, a valve body dimensioned to intimately slide within said valve guide, spring means for biasing said valve body against said valve seat, and radial port means extending through said valve guide downstream of said valve seat for permitting oil to flow through said check valve means when said valve body moves away from said valve seat and axially downstream of said port means; and electrical circuit means connected to said oil bypass means for signaling the existence of a clogged filter within said oil canister and flow of oil through said oil bypass means, said electrical circuit means including, signal means for signaling the existence of a clogged filter, and contact means connected to said check valve means for actuating said electrical circuit means and said signal means in response to opening of said check valve means, said contact means including, compression spring means extending between a dielectric isolation bushing on said oil canister and in full electrical contact with the upstream side of said valve body, said spring means being dimensioned to be in partial compression when said valve body is positioned upon said valve seat and said spring means having a free extension to a position adjacent to but short of the axial position at which the valve body begins to permit oil to pass through said radial port means wherein electrical contact between said valve body and said spring means will be broken approximately when oil begins to flow through said radial port means.

3. In an oil filter system of the type including an oil filter means including an oil inlet means connected to said oil filter means for permitting oil to enter said oil filter means and an oil outlet means connected to said oil filter means for permitting oil to flow out of said oil filter means on the other side thereof wherein oil from a lubrication system may be pumped through said oil filter means for filtering the same wherein the improvement comprises:

a normally closed oil bypass means connected to said oil inlet means for permitting oil to bypass said oil filter means and flow into said oil outlet means in the event said oil filter means becomes clogged with filtered matter, said oil bypass means including, check valve means having an upstream side thereof in fluid communication with said oil inlet means and a downstream side thereof in fluid communication with said oil outlet means wherein a buildup of oil pressure on the inlet side of said oil filter means in excess of a predetermined value will serve to open said check valve means and permit oil to bypass said oil filter means, said check valve means including, a hollow cylindrical valve guide, a valve seat positioned at one end of said valve guide, a valve body dimensioned to intimately slide within said valve guide, spring means for biasing said valve body against said valve seat, and radial port means extending through said valve guide downstream of said valve seat for permitting oil to flow through said check valve means when said valve body moves away from said valve seat; and electrical circuit means connected to said oil bypass means for signaling the existence of a clogged oil filter means and the flow of oil through said oil bypass means comprising, a transistor switch operably connected to a source of electrical potential, said switch including a common ground transistor wherein the base of said transistor is connected to a ground potential through said check valve means;

signal means connected to said transistor switch; and contact means connected to said check valve means for actuating said transistor switch and said signal means in response to opening of said check valve means, said contact means including, compression spring means extending between a dielectric isolation bushing on said check valve means and in full electrical contact with the upstream side of said valve, said spring means being dimensioned to be in partial compression when said valve body is positioned upon said valve seat and said spring means having a free extension to a position adjacent to but short of the axial position at which the valve body begins to permit oil to pass through said radial port means wherein electrical contact between said valve body and said spring means will be broken approximately when oil begins to flow through said radial port means.

4. In an oil filter system of the type including an oil filter means including an oil inlet means connected to said oil filter means for permitting oil to enter said oil filter means and an oil outlet means connected to said oil filter means for permitting oil to flow out of said oil filter means on the other side thereof wherein oil from a lubrication system may be pumped through said oil filter means for filtering the same wherein the improvement comprises:

a normally closed oil bypass means connected to said oil inlet means for permitting oil to bypass said oil filter means and flow into said oil outlet means in the event said oil filter means becomes clogged with filtered matter, said oil bypass means including, check valve means having an upstream side thereof in fluid communication with said oil inlet means and a downstream side thereof in fluid communication with said oil outlet means wherein a buildup of oil pressure on the inlet side of said oil filter means in excess of a predetermined value will serve to open said check valve means and permit oil to bypass said oil filter means, said check valve means including, a hollow cylindrical valve guide, a valve seat positioned at one end of said valve guide, a valve body dimensioned to intimately slide within said valve guide, spring means for biasing said valve body against said valve seat, and radial port means extending through said valve guide downstream of said valve seat for permitting oil to flow through check valve means when said valve body moves away from said valve seat; and electrical circuit means connected to said oil bypass means for signaling the existence of a clogged filter means and flow of oil through said oil bypass means, said electrical circuit means including, signal means for signaling the existence of a clogged filter, and contact means connected to said check valve means for actuating said electrical circuit means and said signal means in response to opening of said check valve means, said contact means including, compression spring means extending between a dielectric isolation bushing on said oil canister and in full electrical contact with the upstream side of said valve body, said spring means being dimensioned to be in partial compression when said valve body is positioned upon said valve seat and said spring means having a free extension to a position adjacent to but short of the axial position at which the valve body begins to permit oil to pass through said radial port means wherein electrical contact between said valve body and said spring means will be broken approximately when oil begins to flow through said radial port means.

* * * * *